(12) United States Patent
Hosoe

(10) Patent No.: US 6,771,435 B2
(45) Date of Patent: Aug. 3, 2004

(54) OPTICAL ELEMENT, METAL DIE, AND CUTTING TOOL

(75) Inventor: Shigeru Hosoe, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/964,728

(22) Filed: Sep. 28, 2001

(65) Prior Publication Data

US 2002/0060857 A1 May 23, 2002

(30) Foreign Application Priority Data

Oct. 2, 2000 (JP) .................................. 2000-302748

(51) Int. Cl.⁷ .................................................. G02B 3/02
(52) U.S. Cl. ...................... 359/719; 359/742; 359/569
(58) Field of Search ................... 359/558, 566, 359/568–76, 642, 719, 741–42

(56) References Cited

U.S. PATENT DOCUMENTS

| | | | | |
|---|---|---|---|---|
| 5,715,091 A | * | 2/1998 | Meyers | 359/565 |
| 5,838,497 A | * | 11/1998 | Maruyama | 359/565 |
| 6,125,087 A | * | 9/2000 | Ohnishi et al. | 369/44.23 |
| 2001/0050815 A1 | * | 12/2001 | Ishihara et al. | 359/566 |
| 2003/0016447 A1 | * | 1/2003 | Kato et al. | 359/569 |

* cited by examiner

Primary Examiner—Jordan M. Schwartz
Assistant Examiner—Jessica Stultz
(74) Attorney, Agent, or Firm—Finnegan, Henderson, Farabow, Garrett & Dunner, L.L.P.

(57) ABSTRACT

An optical element has diffractive grooves. Each diffractive groove includes a first surface approximated by a predetermined optical function; a second surface extending in a direction to cross the first surface and being parallel to the optical axis; and a third surface to connect the first surface and the second surface. A width of the third surface in the direction perpendicular to the optical axis is 0.5% to 15% of the sum of a width of the first surface in the direction perpendicular to the optical axis and the width of the third surface in the direction perpendicular to the optical axis.

14 Claims, 9 Drawing Sheets

FIG. 7 (a)
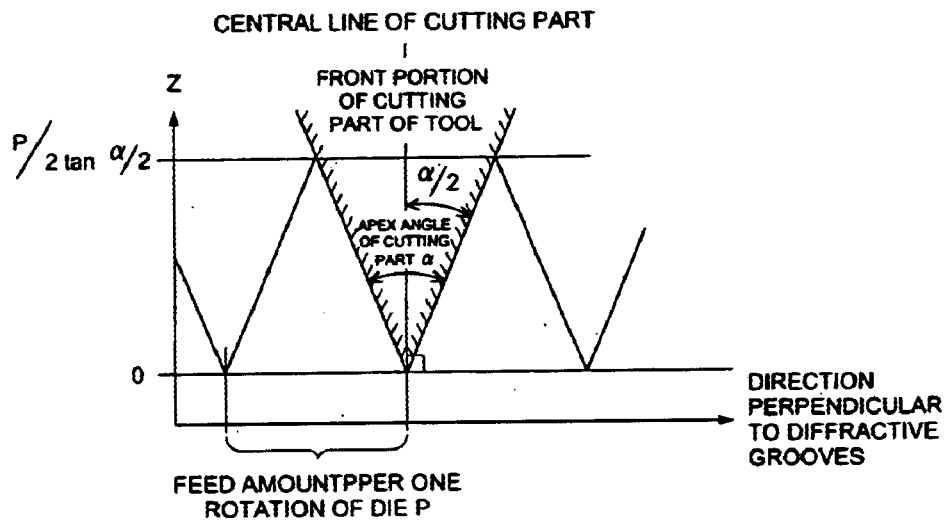
FIG. 7 (b)
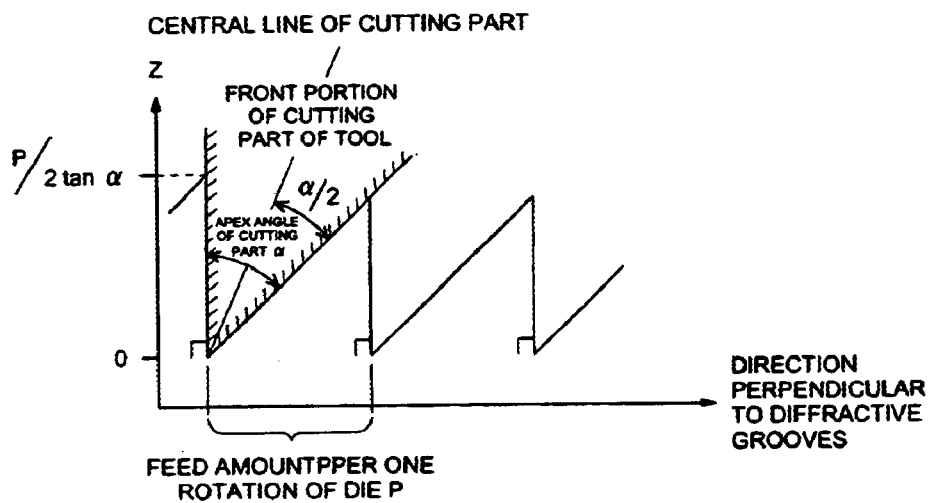
FIG. 7 (c)
| APEX ANGLE OF CUTTING PART | FIG. 7a | FIG. 7b |
|---|---|---|
| | (Rz) | |
| 10° | 5.71P | 5.67P |
| 30° | 1.87P | 1.73P |
| 40° | 1.37P | 1.19P |

OPTICAL ELEMENT, METAL DIE, AND CUTTING TOOL

BACKGROUND OF THE INVENTION

This invention relates to an optical element having diffractive grooves, a metal die for forming it, and a cutting tool for the die, and in particular, to an optical element with a reduced loss of light quantity to make the effective light quantity near to 100%, and a metal die and a cutting tool for obtaining an ideal diffractive optical element by taking into consideration factors such as a shape of diffractive grooves, surface roughness, conditions of working the metal die, a tool for working the metal die, resin material.

A diffraction optical element is an optical element such that sawtooth shaped steps are provided on an optical surface of an optical element, diffraction is generated by varying the phase of a light wave passing there, to utilize the function to deflect the optical path. For a bundle of rays refracted by a basic aspherical shape, by further deflecting the optical path by the effect of diffraction, it can exhibit with a single optical surface a diffraction effect equivalent to that with two optical surfaces. On top of it, an optical path is more difficult to be deflected the longer the wavelength is in the case of refraction, but an optical path through diffraction is more deflected the longer the wavelength is; therefore, the wavelength dependency of refraction can be reduced by combining the both.

For an example of application of a diffractive lens, an image-sensing lens for a camera provided in a personal computer, a pickup optical element for an optical disk etc. can be cited. The former can make chromatic aberration smaller efficiently with a small number of lens pieces by using diffraction effect; therefore, it actualizes an image-sensing lens which is thin, of light weight, and convenient for being provided in a personal computer. Further, for an example of the latter, it can be cited an objective lens which is used in correcting the aberration owing to the wavelength fluctuation of a high-output laser diode as a light source which is generated at the time of writing information after it is read out from an optical disk such as a DVD or a CD.

Further, in order that different optical disks such as a DVD and a CD may commonly use a single optical element, an optical element utilizing a diffraction effect is employed to correct satisfactorily aberration for a plurality of light-source wavelengths and to secure satisfactory chromatic aberration characteristics against wavelength fluctuation owing to temperature variation and a mode hop.

However, in the case of the former lens, if scattering is produced on an optical surface or inside a lens, a flare appears in the formed image to reduce the contrast, which deteriorates the image quality sharply. Especially in the case of a diffractive lens, because of the discontinuous optical surface, it is difficult in designing the lens to make diffraction efficiency 100% for whole incident light in the angle of view, and it has a characteristic such that a certain amount of scattering is produced even if it is ideally produced.

Accordingly, in manufacturing a diffractive lens, in order to reduce scattering by the lens to a level practically of no problem, it is more important than a case of a usual lens to generate the shape of its optical surface which is nearest to the designed shape as much as possible. As for the level of scattering of no practical problem, a level not higher than 5% of incident light quantity, or more desirably a level not higher than 3% is required. This is equivalent to the surface reflectivity of an optical surface made of the representative optical glass such as BK7 in the case where it has not been coated with a reflection reducing coating, and it is the criterion in asking for a necessary image quality and a merit of employing a diffractive optical surface that the loss of light quantity by scattering is at least not more than that by reflection in the state of no reflection reducing coating.

Further, in the case of the latter optical element in a pickup system for an optical disk, because the shortening of life and lowering of reliability are generally more remarkable, the higher power a laser diode outputs, it is preferable to use a laser diode at a low output as much as possible; therefore it is necessary to reduce the loss of light quantity such as scattering in the optical path as much as possible in order to secure a sufficient light quantity in writing.

For a permissible range of the above-mentioned light quantity loss, it is usually obtained a value not larger than 10% of the remainder when an incident light quantity is subtracted by the surface reflection component, or more desirably, a value not larger than 5% of it. This value is empirically obtained by synthesizing such factors as the alignment of the optical element, the light quantity dispersion of laser diodes, the sensitivity dispersion of light receiving devices.

As described in the above, in an optical element utilizing diffraction, as compared to a usual optical element having a continuous optical surface, an influence of scattering etc. is easy to be produced remarkably; accordingly, it is important to obtain an ideal diffraction efficiency without loss of light quantity by scattering, and for that purpose, first of all, it should be mentioned that a diffractive optical surface must be produced in such a manner as to have an ideal shape.

However, in the manufacturing of a conventional diffractive optical element, it is not clear what degree of an error would be practically of no problem for the above-mentioned ideal shape, and in the case where a metal die for forming and transferring a diffractive optical surface is cut-worked, also with respect to the shape of the cutting part of a tool, only it is known that the edge should be made sharp, but it is not clear that to what degree the edge should be sharpened, or what kind of a side effect is produced when it is made sharp.

Further, there has been no idea such that the apex angle of a tool required should be made definite by taking into consideration the parallelism of the step section of diffractive grooves to the incident bundle of rays. Further, also it has not been clear a threshold value of surface roughness to reduce scattering sufficiently at the portion of an optical surface other than the step sections of diffractive grooves. Also for the material to make up the transfer optical surface of a metal die, there has not been a concept that a high-machinability material is necessary in order to maintain the sharp edge of a cutting tool by reducing the wear during working. Because of that, the sharpness of the corner of a cutting part of a tool becomes dull only by cut-working a small number of metal dies. As the result, generation of an ideal shape of diffractive grooves is made impossible, and the following problems have been frequently observed, which are that scattering of an incident bundle of rays is brought about, taking more time for working the optical surface of a metal die than necessary, that scattering becomes larger by an insufficient precision of working, etc.

SUMMARY OF THE INVENTION

This invention was performed by considering main causes of the above-mentioned points, and it is an object of the invention to provide a metal die capable of actualizing the manufacturing of a diffractive optical element having a good efficiency, a tool for the die, and an optical element manufactured by the die.

BRIEF DESCRIPTION OF THE DRAWINGS

FIG. 4(a) is a perspective view, FIG. 4(b) is the front view of the cutting part, and FIG. 4(c) is the side view of the cutting part;

FIGS. 7(a) to 7(c) are drawings showing the relation between setting positions of a metal die and a tool at the time of cut-working;

DETAILED DESCRIPTION OF THE PREFERRED EMBODIMENT

An optical element as set forth in (1) is an optical element which comprises, at least in a part of an optical surface, diffractive grooves (the first groove as counted from the optical axis is not included) provided with at least a first surface approximately expressed by a specified optical function and a second surface extending to the direction crossing said first surface, and is capable of transmitting light, wherein said first surface and said second surface of said diffractive grooves are connected by a third surface which is not approximately expressed by said optical function, said second surface is parallel to the optical axis with an angular error not greater than 1°, and the width of said third surface in the direction perpendicular to the optical axis is not smaller than 0.5% and not larger than 15% of the sum of the width of said first surface connected to it in the direction perpendicular to the optical axis and the width of said third surface in the direction perpendicular to the optical axis; therefore, scattering of an incident bundle of rays is suppressed to the utmost, and transmitted light quantity can be raised.

Figure 1:
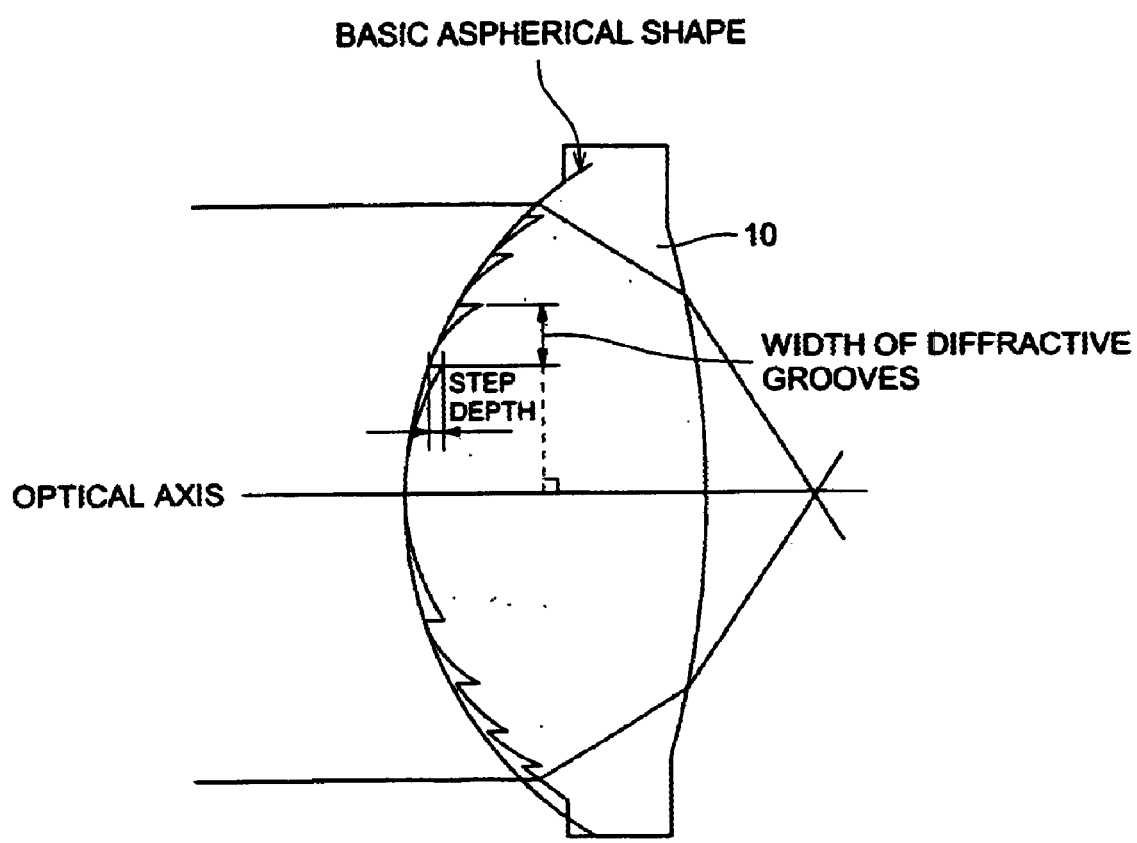
FIG. 1 is a cross-sectional view of an optical element according to this invention.
Figure 2:
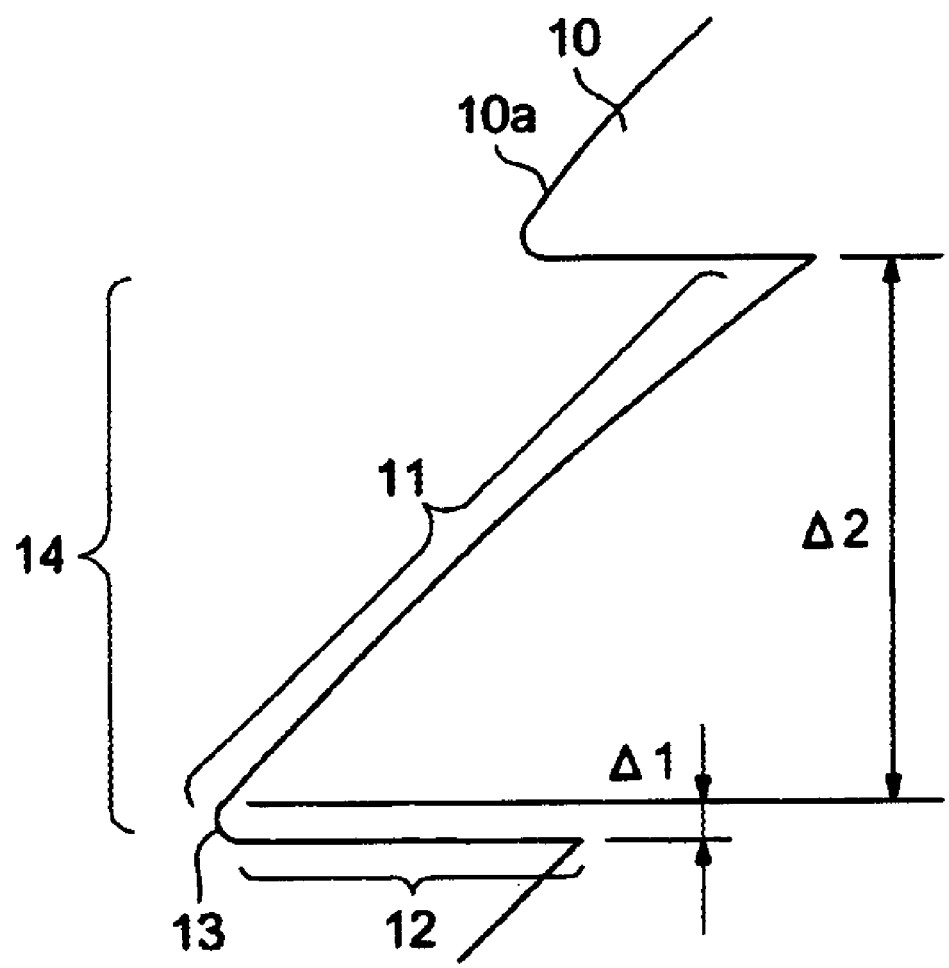
FIG. 2 is an enlarged cross-sectional view in the direction of the optical axis showing a portion near one of the diffractive grooves of an optical element.

This invention will be explained in more detail by referring to the drawings. FIG. 1 is a cross-sectional view of an optical element, and FIG. 2 is an enlarged cross-sectional view in the direction of the optical axis showing a portion near one of the diffractive grooves. In FIG. 2, the optical element 10 comprises an optical surface 10a at the left side in the drawing. On the optical surface 10a, one of the diffractive grooves 14 is formed. The diffractive groove 14 is formed of the first surface 11 which is approximately expressed by a basic aspherical surface and a phase difference- or an optical path difference-function, the second surface 12 which is parallel to the optical axis with an angular error not larger than 1°, and the third surface 13 which connects these. The width $\Delta 1$ of the third surface in the direction perpendicular to the optical axis is not smaller than 0.5% and not larger than 15% of the sum of the width $\Delta 2$ of said first surface 11 connected to it in the direction perpendicular to the optical axis and the width $\Delta 1$ of the third surface 13 in the direction perpendicular to the optical axis. That is, the following expression should be satisfied:

$$(\Delta 1 + \Delta 2) \times 0.5/100 \leq \Delta 1 \leq (\Delta 1 + \Delta 2) \times 15/100.$$

Because the third surface 13 is not expressed approximately by a basic aspherical surface and a phase difference- or optical difference-function, it is a region not concerning the improvement of the optical performance of the optical element 10; hence, it should be narrow as much as possible. However, because the corner of the cutting part of a tool has a certain size, in manufacturing a metal die, a surface of the metal die corresponding to the third surface 13 is inevitably formed. Therefore, by making this surface small to the utmost, the third surface is controlled to be narrow as described in the above, by which the transmitted light quantity through the optical element 10 is secured sufficiently.

As shown in FIG. 1 and FIG. 2, the shape of the diffractive grooves has a shape which has steps and is patched and darned with aspherical surfaces, and because a bundle of rays from a light source produces phase differences owing to these steps to generate diffraction, a function to deflect the path of the transmitted light in a specified direction is produced. If a bundle of rays transmitted through this diffractive optical surface has a light quantity equal to 100% of a value which is obtained by subtracting the surface reflection component owing to the refractive index difference from the incident bundle of rays, the diffraction efficiency is 100%, but actually the diffraction efficiency does not become 100% owing to several factors.

Figure 3:
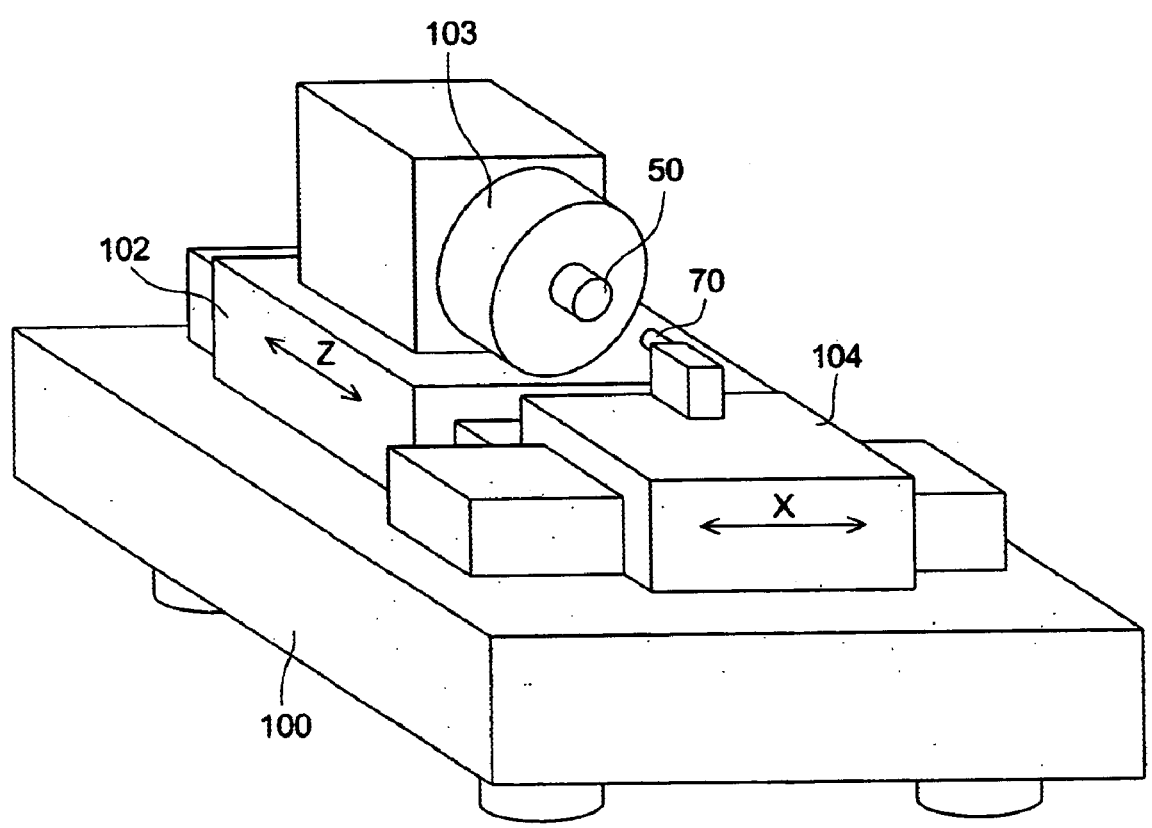
FIG. 3 is a perspective view showing a double or triple spindle super-precision lathe.
Figure 4:
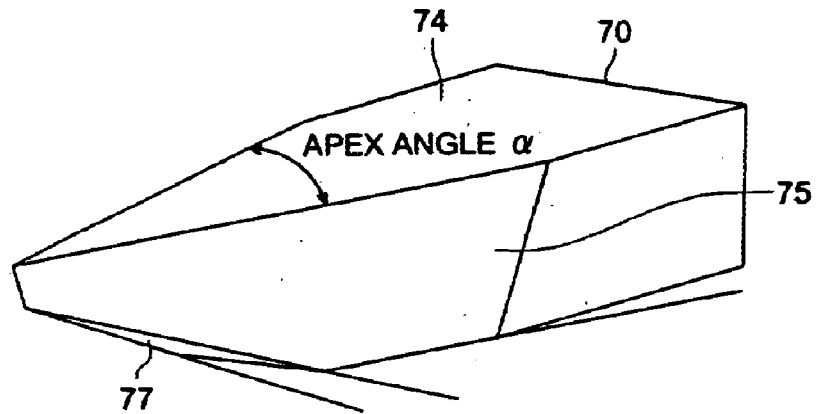
FIG. 4 are drawings showing a tool for cutting a metal die.
Figure 4:
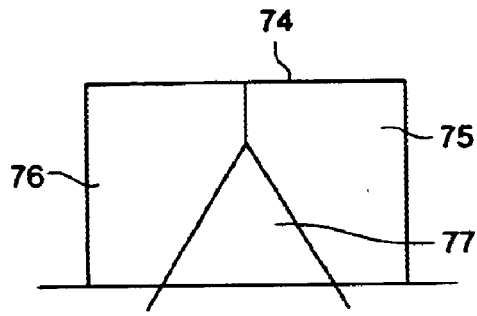
Figure 4:
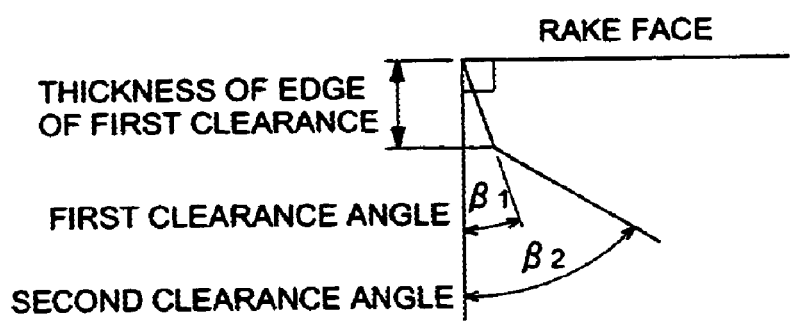

Next, a method of working a metal die for forming and transferring diffractiive grooves of a diffractive optical element will be shown. In FIG. 3, a perspective view of a double or triple spindle super-precision lathe is shown. FIG. 4 is a drawing showing a tool for cutting a metal die; FIG. 4(a) is a perspective view of it, FIG. 4(b) is the front view of the cutting part, and FIG. 4(c) is the side view of the cutting part.

In FIG. 3, on a spindle slide table 102 which is supported on a base plate 100 and capable of moving in the Z direction, an air spindle 103 is disposed, to support a metal die 50 in a manner capable of rotation. On the other hand, at this side of the spindle slide table 102, a tool table which is capable of moving in the X direction is disposed, to support a tool 70.

As the metal die 50 is being rotated by the air spindle 103, the surface of the metal die 50 corresponding to the diffractive grooves of an optical element is cut-worked with a diamond tool 70 with a shape of a bayonet having its corner of the cutting part sharply pointed as shown in FIG. 4. Because it is usually required that the shape error in working an aspherical shape is not greater than 50 nm, it is more general to carry out the working by using a double spindle super-precision lathe which is simpler and easy to do a high-speed working than a triple spindle type for which the positional adjustment of the cutting part of a tool is complicated. Accordingly, to the shape of valleys on the metal die 50 corresponding to diffractive grooves, the shape of the corner of the tool is transferred as it is; therefore, to what degree the corner of the cutting part of the tool is sharp becomes one of the important factors influencing diffraction efficiency.

In FIG. 4, the cutting part of the tool is sharply pointed and the corner of the cutting part converges to a point; however, the corner of the cutting part of an actual tool has a shape such that the corner of the rake face has a shape of a minute arc or plane for example, or a complicated shape produced by a minute chipping at the time of manufacturing the tool, and has a size not smaller than several hundreds nm. In this specification, this portion is referred to as the third part of the cutting edge, and the shape on an optical surface cut-formed by this portion is referred to as the third surface.

Figure 5:
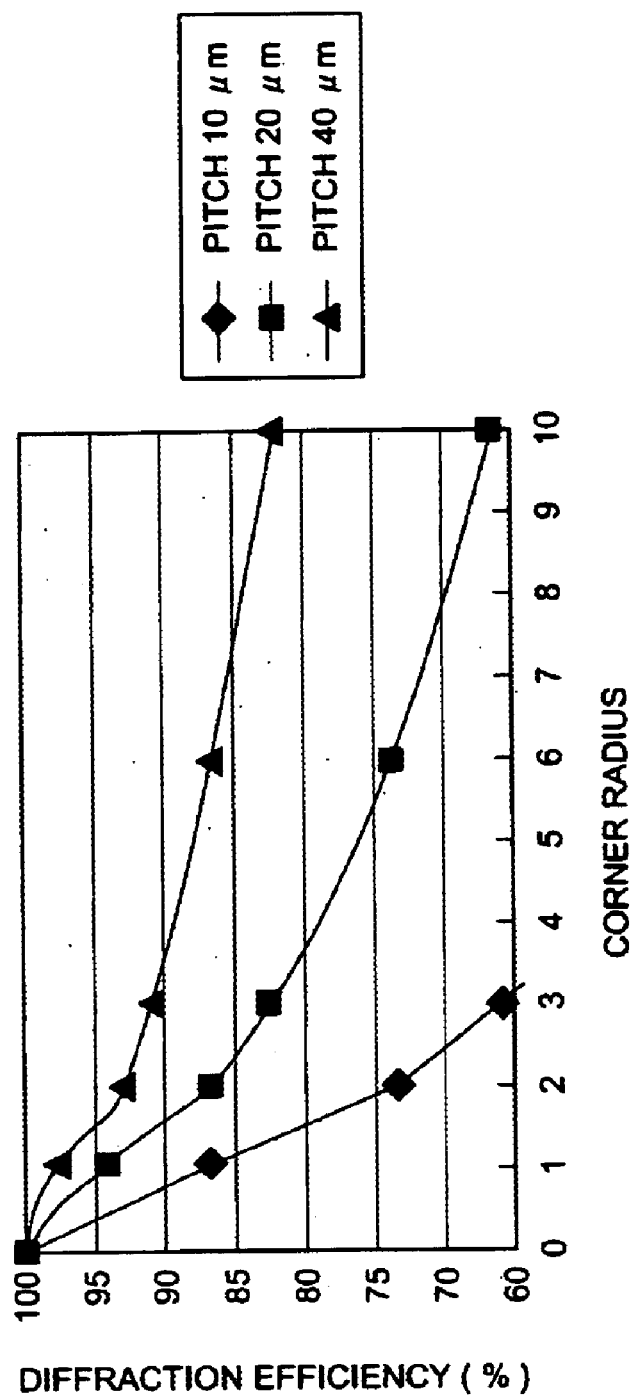
FIG. 5 is a graph showing the lowering of diffraction efficiency for a single light-source wavelength in a sawtooth-shaped diffractive optical surface of a flat plate, when diffractive grooves are cut-worked by using a tool having the arc-shaped corner of the cutting part in working the metal die.

FIG. 5 is a graph showing the lowering of diffraction efficiency for a single light-source wavelength in a sawtooth-shaped diffractive optical surface of a flat plate, when diffractive grooves are cut-worked by using a tool having the arc-shaped corner of the cutting part in working the metal die; this graph is prepared by taking the arc radius of the corner of the cutting part for the abscissa, the diffraction efficiency for the ordinates, and taking three kinds of width (pitch) values of the diffractive grooves 10 $\mu$m, 20 $\mu$m, and 40 $\mu$m in the direction perpendicular to the optical axis for a parameter. At the corner radius size of the tool of 10 $\mu$m, the diffraction efficiency is lowered to 82.3% even for the pitch of the diffractive grooves of 40 $\mu$m, to 66.2% for the pitch of 20 $\mu$m, and 39.1% for the pitch of 10 $\mu$m, which is not shown in the graph, to make most of the incident light scattered and the diffraction effect impossible to expect. Even in the case where the corner radius size of the tool is so small as 3 $\mu$m, the diffraction efficiency is 90.8% for the pitch of 40 $\mu$m, 82.3% for the pitch of 20 $\mu$m, and 65.4% for the pitch of 10 $\mu$m, which means that 1/3 of the light quantity is scattered still. Inversely speaking, in order to make the quantity of scattered light not greater than 10% or 5% by the above-mentioned criterion, it is necessary that the corner radius of the cutting part of a tool is made to be not greater than 3.5 $\mu$m or 1.5 $\mu$m for the pitch of 40 $\mu$m, not greater than 1.5 $\mu$m or 0.9 $\mu$m for the pitch of 20 $\mu$m, and not greater than 0.7 $\mu$m or 0.3 $\mu$m for the pitch of 10 $\mu$m, respectively.

From the above description, it can be understood that, in order to make the quantity of scattered light to be not greater than 10% or 5%, the ratio of the width in the direction perpendicular to the optical axis, of the groove portion which cannot be cut to an ideal shape owing to the corner radius of the cutting part of a tool, to the width of the diffractive grooves in the same perpendicular direction is at least not greater than 10%, or more desirably, not greater than 5%.

Figure 6:
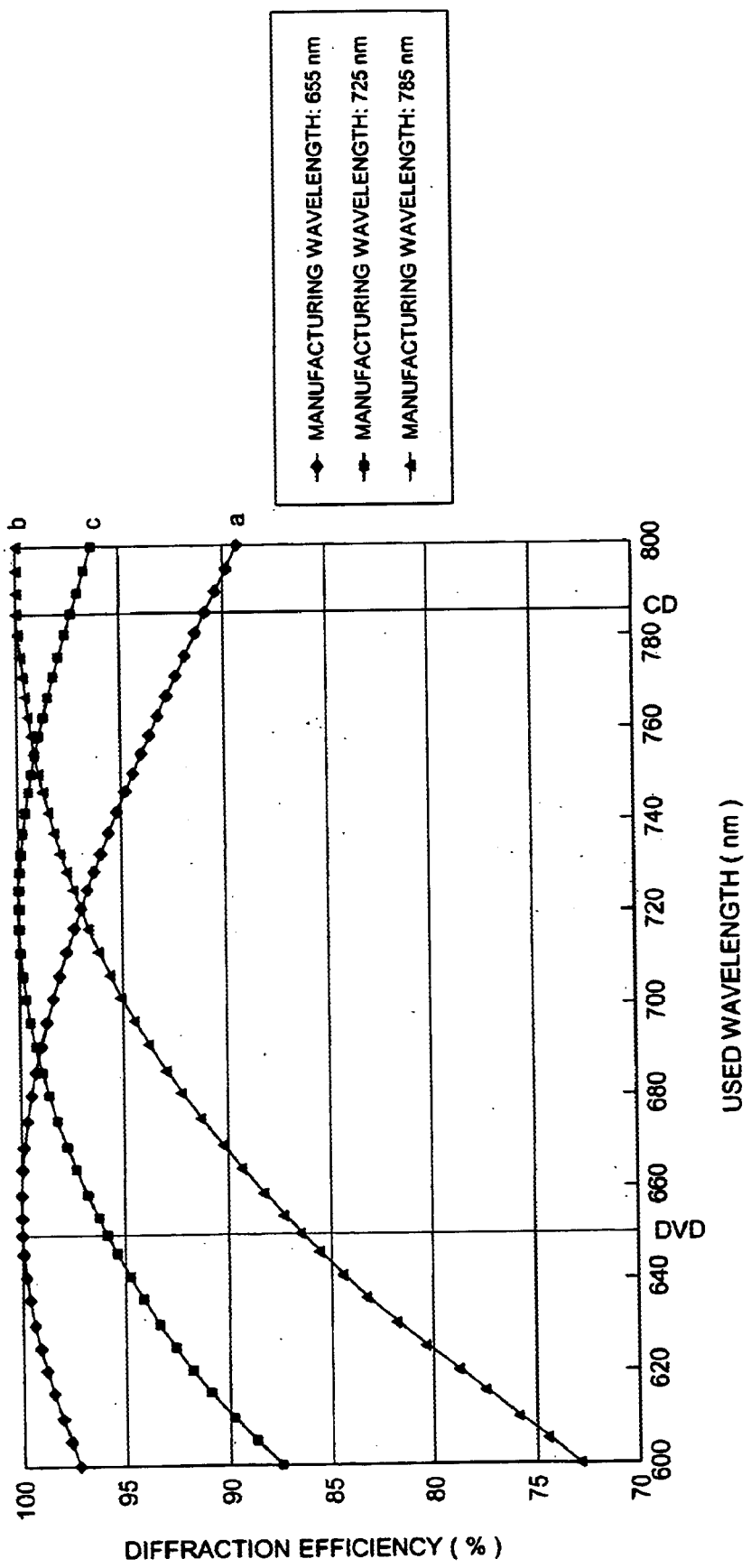
FIG. 6 is a drawing showing the relation between wavelength used taken for the abscissa, and the diffraction efficiency of an optical element taken for the ordinate.

Incidentally, there is an actual situation that, in the case where diffraction is utilized for a plurality of light wavelengths as described in the foregoing, diffraction efficiency cannot be made 100% for all the wavelengths used. FIG. 6 is a drawing showing the relation between wavelength used, which is taken for the abscissa, and diffraction efficiency of an optical element, which is taken for the ordinate. The curve a shows the diffraction efficiency in the case where the depth of the steps of the diffractive grooves is designed to be such an amount as to make 100% the diffraction efficiency at the wavelength 655 nm, which is the wavelength of a light source for a DVD. In this case, it is understood that, at the wavelength 785 nm, which is the wavelength of a light source for a CD, the quantity of the transmitted light is lowered to 91%, even though the loss owing to surface reflection is omitted.

On the other hand, the curve b shows the diffraction efficiency in the case where the depth of the steps of the diffractive grooves is designed to be such an amount as to make 100% the diffraction efficiency at the wavelength to be used for a CD, and at the wavelength to be used for a DVD, diffraction efficiency is lowered to a degree of 87.5%, and a large amount of light quantity loss is produced. Therefore, for a diffractive optical element to be used for a plurality of light-source wavelengths, it is used a method such that the designed wavelength is adjusted usually in such a way as to make diffraction efficiency 100% at a wavelength approximately in the middle of the both wavelengths as shown by the curve c, to maintain a fairly satisfactory diffraction efficiency for either of the light-source wavelengths. For the curve c, the depth of steps of the diffractive grooves is designed so as to make diffraction efficiency 100% at the wavelength 720 nm, and diffraction efficiency is maintained to be about 98% for the wavelength to be used for a DVD, and about 97% for the wavelength to be used for a CD.

Accordingly, it should be understood that even if an ideal optical surface can be obtained, in an optical system in which a plurality of light wavelengths are used as described in the above, light quantity loss of about 3% is inevitably produced for every diffractive optical surface. On top of it, because the above-mentioned lowering of diffraction efficiency owing to the corner radius of the cutting part of a tool is generated in the same way as the case of a single wavelength independently of these, it is necessary to control the corner radius of the cutting part of a tool to be smaller.

In this case, assuming that diffraction efficiency is not lower than 95%, the decrement of diffraction efficiency owing to the corner radius of the cutting part of a tool must be 2% or under, and the corner radius of a tool should be 1 $\mu$m or under for the pitch 40 $\mu$m, 0.5 $\mu$m or under for the pitch 20 $\mu$m, and 0.1 $\mu$m or under for the pitch 10 $\mu$m. The ratio of the width in the direction perpendicular to the optical axis, of the portion which is formed not to have an ideal shape owing to the size of the corner of the cutting part to the width of the grooves in the same direction is generally 8% or under.

In this specification, the shape of the corner of the cutting part of the cutting tool 70 is assumed to be an arc; however, in the case of an actual tool, the shape of the corner of a tool becomes mostly as it is formed at the time of making the apex angle by grinding, and it has not always a shape of an exact arc. However, it is not varied that the size of the corner of a tool with respect to the width of diffractive grooves influences diffraction efficiency, and it is required in order not to lower diffraction efficiency by 2% or more that the ratio of the size of corner of a tool to the width of diffractive grooves is 15% or under as described in the above, or in order to make the lowering of diffraction efficiency not larger than 1%, it is necessary to make the proportion of the non-ideal-shaped portion of diffractive grooves 8% or under. Further, because the size of the corner of the cutting part of a tool is about 0.3 $\mu$m or so for the best condition in the manufacturing process, it is understood that, assuming the proportion of non-ideal-shaped diffractive grooves is up to 15%, the minimum width of diffractive grooves is 2 $\mu$m or so.

However, an accident that the cutting part of a diamond tool is chipped during the manufacturing of the tool occurs more frequently, the sharper the corner is made; thus, in the case where the corner size of the cutting part of a tool is 1

μm or under, the yield of manufacturing tools is lowered sharply. Further, regarding a refracting surface between steps, if the corner of the cutting part of a tool is made sharper, the surface roughness is deteriorated in the case of working with the same tool feed; therefore, the amount of the generation of scattering in this portion increases. Up to this time, the corner size of the cutting part of a tool has never been checked in view of such a practical problem, but only it is emphasized that the corner of the cutting part of a tool should be made minute for improving diffraction efficiency.

Further, in the case where a plurality of light wavelengths are used, because a shape which makes diffraction efficiency 100% for any one of the wavelengths extremely lowers diffraction efficiency for other wavelengths, no other shape can be selected than one that makes diffraction efficiency fairly sufficient for the plural wavelengths; thus, even a shape of diffractive grooves that is ideal in the designing stage does not make diffraction efficiency 100% at the wavelengths used, and the loss of transmitted light quantity of several % owing to scattering is generated. In such a situation, it is necessary to avoid the loss of transmitted light quantity in an actual optical element thoroughly, but up to this time, it has never been made definite that, for such an optical element to cope with a plurality of wavelengths, a particularly careful study is required.

An optical element set forth in (2) is characterized by it that the aforesaid specified optical function is expressed by the following equations:

$$N=INT(Ah^2+Bh^4+C),$$

$$X(h,N)=h^2/(r_N(1+\sqrt{(1-(1+K_N)h^2/r_N^2)}))+A4_N h^4+A6_N h^6+A8_N h^8+A10_N h^{10}+\Delta N,$$

where N denotes the number of a ring-shaped zone of the aforesaid diffractive grooves, h denotes a height from the optical axis, X denotes a distance from a tangent plane in the direction of the optical axis, r denotes the radius of the curvature of the Nth ring-shaped zone, $K_N, A4_N$ to $A10_N$ are the coefficients of the aspherical surface, and $\Delta=-\lambda_0/(n-1)$ denotes the amount of the shift of the wave front on the optical axis for $1\lambda_0$. The above equations are noted in p. 92 of "Introduction to Diffractive Optical Elements" (published by Optronics Inc.), and the shape of a cross-section including the optical axis can express a sawtooth-shaped diffractive surface. In the above expression, $\lambda_0$ may be made the manufacturing wavelength of diffraction ring-shaped zones. In addition, it is possible to use any functions other than the ones described in the above, so long as they can express the shape of the diffraction surface of an optical element.

Generally speaking, the pitch of diffractive ring-shaped zones (the position of each of ring-shaped zones) is defined by using a phase difference function or an optical path difference function. To state it concretely, the phase difference function $\Phi b$ is expressed by the following equation described in [M1] with radian taken for the unit, and the optical path difference function $\Phi B$ is expressed by the equation described in [M2] with mm taken for the unit.

$$\Phi_b = \sum_{i=0}^{\infty} b_{2i} h^{2i} \quad [M1]$$

$$\Phi_B = \sum_{i=0}^{\infty} B_{2i} h^{2i} \quad [M2]$$

Although the units are different, these two ways of expression are equivalent in the sense that they both express the pitch of diffraction ring-shaped zones. That is, for a blazed wavelength λ (unit: mm), the coefficient of the phase difference function b can be converted into the coefficient of optical path difference function B by multiplying $\lambda/2\pi$ to it, and inversely, the coefficient of the optical path difference function B is converted into the coefficient of the phase difference function b by multiplying $2\pi/\lambda$.

Now, for the simplicity of explanation, a diffractive lens utilizing the first order diffraction light beam will be explained. In the case of optical path difference function, a ring-shaped zone is carved every time when the value of the function exceeds an integral multiple of the blazed wavelength λ, and in the case of the phase difference function, a ring-shaped zone is carved every time when the value of the function exceeds an integral multiple of $2\pi$.

For example, it is assumed a lens which is formed of a cylindrical-shaped body having diffractive ring-shaped zones carved on the plane of the object side of the both planes of the cylinder having no refracting power, and assuming that the blazed wavelength is 0.5 μm=0.0005 mm, the second order coefficient of the optical path difference function (the second power term) is −0.05 (if it is converted into the second order coefficient of the phase difference function, it becomes −628.3), and the coefficients of other orders are all zero, for the radius of the first ring-shaped zone, h=0.1 mm, and for the radius of the second ring-shaped zone, h=0.141 mm. Further, regarding the focal length f of this diffractive lens, it is known that, for the second order coefficient of the optical path difference function B2=−0.05, f=−1/(2·B2)=10 mm.

In the case based on the above-mentioned definition, by making the second order coefficient of the phase difference function or the or the optical path difference function a value not equal to zero, it is possible to make a lens have a power. Further, by making the coefficient other than the second order one of the phase difference function or the optical path difference function, for example, the fourth order coefficient, the sixth order coefficient, the eighth order coefficient, or the tenth order coefficient a value not equal to zero, it is possible to control a spherical aberration. In addition, the term "to control" as used in the above description means to correct the spherical aberration, which the portion having a refracting power produces, by producing a reverse spherical aberration, or to make the total spherical aberration have a desired value.

An optical element set forth in (3) is characterized by it that it is a coupling lens of an optical pickup device for use in an information recording and/or reproducing apparatus.

An optical element set forth in (4) is characterized by it that it is an objective lens which converges a parallel beam coming from direction of the optical axis.

An optical element set forth in (5) is characterized by it that it is an objective lens which converges a divergent light beam coming from the direction of the optical axis.

An optical element set forth in (6) is characterized by it that it is a collimator.

An optical element as set forth in (7) is an optical element which comprises, at least in a part of an optical surface, diffractive grooves provided with at least a first surface approximately expressed by a specified optical function, and a second surface extending in the direction crossing said first surface, and is capable of transmitting a light beam from a single light source or light beams from a plurality of light sources having different wavelengths, wherein the Rz value of surface roughness of said first surface is not greater than 1/10 of the used wavelengths of said light sources; therefore, the quantity of transmitted light can be sufficiently secured by suppressing scattering of an incident light beam.

In addition, the minimum value of the Rz value of the surface roughness of said first surface is not smaller than $1/1000$ of the used wavelengths of said light sources. Moreover, these Rz values of surface roughness are values defined by JIS B0601-1994 (ISO 4287).

In the case where a metal die for an optical surface is worked by a lathe with a cutting tool having a pointed corner, the condition of tool feeding influences the surface roughness of the optical surface to be generated to a large extent. Accordingly, even though the pitch, and the ridgelines of the peaks and valleys are approximately ideal-shaped simply, and the diffraction efficiency is close to ideal, a large surface roughness of the transmitting surface would scatter an incident bundle of rays to cause the transmitted light quantity to decrease. The scattering owing to surface roughness is inversely proportional to the fourth power of wavelength if it is regarded as Rayleigh scattering; therefore, if the wavelength of a light source used is made shorter, scattering increases sharply even for the same surface roughness, to produce a large loss of transmitted light quantity. Hence, it is reasonable to specify the surface roughness of a transmitting optical surface in accordance with the wavelength to be used, and if the Rz value of surface roughness is not larger than $1/10$ of the wavelength, scattering exceeding 1% is not generated. The Rz value of surface roughness is a value calculated by subtracting the values of the lowest 5 valley points from the values of the highest 5 peak points respectively, and averaging out the differences, and is a reliable PV value (maximum-minimum value) which is hard to be influenced by a noise or an abnormal point by averaging out.

Further, in a cut-working with a diamond tool, it is generally known that a damaged layer having a depth of about 1 nm on the worked surface is formed by the cutting force during working, and in this damaged layer, because the arrangement of atoms is varied from the state before working, it is very difficult to control the surface roughness of working under the thickness of this damaged layer. Hence, the lowest limit value of the Rz-value of surface roughness is about $1/1000$ in terms of the wavelength to be used.

In an optical element set forth in (8), the aforesaid specified optical function is characterized by it that it is expressed by the following equations:

$$N=INT(Ah^2+Bh^4+C),$$

$$X(h,N)=h^2/(r_N(1+\sqrt{(1-(1+K_N)h^2/r_N^2)}))+A4_Nh^4+A6_Nh^6+A8_Nh^8+A10_Nh^{10}+\Delta N,$$

where N denotes the number of a ring-shaped zone of the aforesaid diffractive grooves, h denotes a height from the optical axis, X denotes a distance from a tangent plane in the direction of the optical axis, r denotes the radius of the curvature of the Nth ring-shaped zone, $K_N A4_N$ to $A10_N$ are the coefficients of the aspherical surface, and $\Delta=-\lambda_0/(n-1)$ denotes the amount of the shift of the wave front on the optical axis for $1\lambda_0$.

In an optical element set forth in (9), the aforesaid second surface is characterized by it that it is parallel to the optical axis with an angular error not greater than 1°.

An optical element set forth in (10) is an optical element as set forth in any one of structures (7) to (9) characterized by it that it is a coupling lens of an optical pickup device for use in an information recording and/or reproducing apparatus.

An optical element set forth in (11) is characterized by it that it is an objective lens which converges a parallel light beam coming from the direction of the optical axis.

An optical element set forth in (12) is characterized by it that it is an objective lens which converges a divergent light beam coming from the direction of the optical axis.

An optical element set forth in (13) is characterized by it that it is a collimator.

A metal die set forth in (14) is a metal die which comprises, at least in a part of an optical surface, diffractive grooves provided with at least a first surface approximately expressed by a specified optical function, and a second surface extending in the direction crossing said first surface, and is used in forming an optical element capable of transmitting a light beam by molding, wherein the surface of said metal die corresponding to at least said first surface of said optical element is formed by rotary cut-working, and the amount of feed of a cutting tool in the radius direction at the time of working falls within a range from 0.1 µm to 1 µm per one rotation of said metal die; therefore, the quantity of transmitted light can be sufficiently secured by suppressing scattering of an incident light beam.

FIG. 7 are drawings showing the relation between setting positions of a metal die and a tool at the time of cut-working. The Rz value of surface roughness that is obtained when a refracting optical surface is cut-worked by an actual cut-working is varied in accordance with the way of setting a tool as shown in FIG. 7. FIG. 7(a) shows the case of an offset angle of 0° where a tool is set in such a way that the central line of the tool becomes parallel to the optical axis of the optical surface of the metal die; in this case, the step section of diffractive grooves become conical around the optical axis, and in particular, for an infinite incident bundle of rays, optically unnecessary part is produced. FIG. 7(b) shows the case where a tool is set with an offset angle of $\alpha/2$ to right in such a way that the one of the flanks making the apex angle $\alpha$ of the tool becomes parallel to the optical axis in order to make the step section of the diffractive grooves parallel to the optical axis. As clearly understood from the both drawings, in the relation shown in FIG. 7(a), the Rz value is theoretically $P/2 \tan\{\alpha/2\}$ for an amount of feed per one rotation of the metal die P (called a feed rate also), and in the relation shown in FIG. 7(b), $Rz=P/\tan \alpha$ is given. In this case, if the tool apex angle $\alpha$ is as small as 10° or under, the difference between the Rz values for both cases can be regarded approximately as zero, because $2 \tan(\alpha/2) \approx 2\times\alpha/2 = \alpha \approx \tan \alpha$.

However, such a small apex angle of a tool is actually not general, because it causes chipping of the cutting part frequently to occur during manufacturing of a tool, and breakage of the cutting part during cut-working is easy to be generated. Further, it does not lower also the Rz value itself. Usually, it is general that the apex angle of a tool is determined to be about 30 to 40° with the above-mentioned things taken into consideration, and the Rz values for these cases are compared in the table shown in FIG. 7(c). It is understood that surface roughness is improved for the relation of FIG. 7(b) by 7.5% at the tool apex angle 30° and almost 15% at the tool apex angle 40° than the case shown in FIG. 7(a). Further, to state it inversely, for obtaining the same value of the surface roughness Rz, the tool setting shown in FIG. 7(b) can perform cut-working with a feed rate P faster by 7.5 to 15% than the relation of FIG. 7(a); therefore, working of a die can be performed with a higher speed and better efficiency.

Now, surface roughness Rz will be explained. In an example of an objective lens for a pickup device employing a conventional refracting lens or a collimator, for the used wavelength 650 nm, the surface roughness Rz of an optical surface was about 50 nm, and the loss of light quantity of the formed lens owing to the surface scattering was 1% or under. From this fact, it is understood that the loss of light quantity owing to Rayleigh scattering can be reduced to an almost negligible degree, if the surface roughness Rz of a lens which is formed by an optical surface of a metal die cut-worked with a diamond tool.

Further, in order to obtain a better surface roughness, it is appropriate to make small the above-mentioned amount of feeding a tool per one rotation of an optical surface of a metal die (feed rate) P, by lowering the speed of feeding the tool during the cut-working of an optical surface. However, to make the feed rate P small means to prolong the time for cut-working, and about 1/10 times of the present feed rate is practically a limit for the reason of productivity. Because the surface roughness value Rz of an optical element which is cut-worked with a tool having a pointed corner is proportional to the feed rate P as shown in FIG. 7(c), the Rz value obtained by a cut-working in this condition is about 1/100 of the wavelength of the used light source, as it is 1/10 of the above-mentioned value. To summarize the above-mentioned, in order to eliminate the influence of light quantity loss owing to Rayleigh scattering, only it is necessary to make Rz value 1/10 or under of the wavelength of the used light source, and practically it is desirable to make it not smaller than 1/100 at the same time.

Incidentally, in the cut-working of the optical surface of a metal die with a tool, if it is supposed to be obtained, the feed rate P to satisfy the condition for making the Rz value fall within a range from 1/1000 to 1/10 of the wavelength of the used light source as described in the above, assuming that the wavelength of the used light source is 650 nm, and a tool having the apex angle of the cutting part 30° is set at an offset angle of 15° as shown in FIG. 7(b), the feed rate falls within a range from 3.75 nm/rev to 37.5 nm/rev This is a value in the case where the corner of the cutting part of the tool makes a perfect apex, and it is understood that an extremely lower feed rate is necessary as compared with a usual feed rate which is from 2 to 4 μm/rev Because such a low feed rate value gives too low a productivity in the actual working of metal dies, it is of no practical use in the case where a mass of metal dies are necessary.

However, in the case of the corner of the cutting part of an actual straight turning tool, there is a limit in making it sharp for the reasons of yield in manufacturing and efficiency, to result in a minute round-shaped corner in most cases. In some cases, even chamfering is done by cutting off the corner of the cutting part intentionally in order to prevent breakage. As described in the above, in a situation such that there is a minute arc at the corner of the cutting part, the feed rate value can be remarkably improved as described below, with the surface roughness of working suppressed to a low value.

The following relation is known between the feed rate P in the case where corner radius R is given to the corner of the cutting part and the surface roughness Rz of working:

$$Rz = R(1-\cos\phi), \text{ where } \phi = \sin^{-1}(P/2R) \qquad \text{(eq. 1)}.$$

On the basis of this, the values of the feed rate P, which are obtained for Rz values at λ=650 nm, including the case where the corner of the cutting part is an apex, are shown in the following [Table 1]. For the corner radius R of the cutting part, diffraction efficiency is improved sharply for R values of 3 μm or under as shown in FIG. 5 too, and for R values of 1 μm or under, the improvement of diffraction efficiency accompanied by its getting further minute becomes gentle. Therefore, in this invention, it is specified the case where the corner of the cutting part lies at a distance from the position of the virtual apex point within a range from 0.1 μm to 3 μm with the cases where the apex angle α is up to 90° taken into consideration, including the case where the corner of the cutting part is not round. On the other hand, from the practical view point to reduce the lowering of yield owing to chipping during manufacturing of a tool and the wear by grinding, efficiency, etc., and chipping during actual cut-working and breakage of the corner of the cutting part, it is said that the limit of the corner radius R of the cutting part is about 0.3 μm; therefore, it can be said that the range of the corner radius R of the cutting part from 0.3 μm to 0.5 μm is an optimum range to keep diffraction efficiency high and to make a stable supply and working possible. Assuming that the apex angle of the cutting part has a general value, which is about 40°, including also the above-mentioned case where the corner of the cutting part is not round, for a more desirable range, it can be considered that the corner of the cutting part lies at a distance from the virtual apex point falling within a range from 0.2 μm to 1.5 μm. The following [Table 1] shows the values of the feed rate P which are calculated for the above-mentioned range with the corner radius R of the cutting part varied.

TABLE 1

| Edge end R | Rz = λ/10 | Rz = λ/100 |
|---|---|---|
| R = 0 | 37.5 nm/rev | 3.8 nm/rev |
| R = 0.1 μm | 137.0 nm/rev | 57.7 nm/rev |
| R = 0.3 μm | 241.0 nm/rev | 111.0 nm/rev |
| R = 0.5 μm | 361.0 nm/rev | 147.0 nm.rev |

Now, if the case where the corner radius R of the cutting part is 0.3 μm, which is a limit value in manufacturing a tool, is compared with the case where the corner radius R is zero, that is, an ideal apex, for obtaining the surface roughness Rz value λ/100 (6.5 nm), the difference in feed rate is more than 15 times, and this as itself directly indicates that the corner of the cutting part being made 0.3 μm can improve the efficiency of cut-working of a metal die by more than 15 times. Further, it is understood by this that the corner radius R of the cutting part 0.3 μm means not only the limit from the view point of the yield of manufacturing and the efficiency, but also the limit of minuteness in cut-working for the reasons of suppressing Rayleigh scattering and securing a practical productivity. To summarize the above-mentioned things, in the case where an optical surface of a metal die is cut-worked with a straight turning tool, it is ideal to determine the feed rate in accordance with the size of the corner radius R of the cutting part, but it is necessary to make it at least 1 μm/rev or under and it is desirable to make it 100 nm/rev or over.

An equivalent corner radius R of the cutting part is obtained from a distance D from the apex of the cutting part to a position including the whole corner edge. In respect of a corner edge of a straight turning tool which lies within the distance D from the virtual apex of the cutting part, the shape of the corner edge is not always an arc; however, by substituting for the shape an equivalent arc whose size is not so much different from the size of the front edge of the cutting part for generalization, a value of criterion for a surface roughness Rz of working and a feed rate which is a condition of cutting can be obtained. Now, this equivalent corner radius R of the cutting part is to be obtained by the following equation:

$$R = D \cdot \tan(\alpha/2) \qquad \text{(eq. 2)},$$

where α denotes the apex angle of the cutting part.

In a metal die set forth in (15), the aforesaid second surface is characterized by it that it is parallel to the optical axis with an angular error not greater than 1°.

An optical element set forth in (15) is characterized by it that said optical element is formed by injection molding or by injection compression molding using a metal die as set forth in (14) or (15).

In an optical element set forth in (17), the aforesaid specified optical function is characterized by it that it is expressed by the following equations:

$$N=INT(Ah^2+Bh^4+C)$$

$$X(h,N)=h^2/(r_N(1+\sqrt{(1-(1+K_N)h^2/r_N^2)}))+A4_Nh^4+A6_Nh^6+A8_Nh^8+A10_Nh^{10}+\Delta N,$$

where N denotes the number of a ring-shaped zone of the aforesaid diffractive grooves, h denotes a height from the optical axis, X denotes a distance from a tangent plane in the direction of the optical axis, r denotes the radius of the curvature of the Nth ring-shaped zone, $K_NA4_N$ to $A10_N$ are the coefficients of the aspherical surface, and $\Delta=-\lambda_0/(n-1)$ denotes the amount of the shift of the wave front on the optical axis for $1\lambda_0$.

An optical element set forth in (18) is characterized by it that it is a coupling lens of an optical pickup device for use in an information recording and/or reproducing apparatus.

An optical element set forth in (19) is characterized by it that it is an objective lens which converges a parallel light beam coming from the direction of the optical axis.

An optical element set forth in (20) is characterized by it that it is an objective lens which converges a divergent light beam coming from the direction of the optical axis.

An optical element set forth in (21) is characterized by it that it is a collimator.

A tool set forth in (22) is a tool for cutting a metal die to be used in forming by molding an optical element which comprises, at least in a part of an optical surface, diffractive grooves provided with a first surface expressed approximately by a specified optical function, a second surface extending in the direction crossing said first surface, and a third surface connecting said first surface and said second surface, and is capable of transmitting light, wherein at least a part of the surface of said metal die is formed by rotary cut-working using said tool, the rake face of said tool, which is opposite to the rotating direction of said metal die during said rotary cut-working, is outlined by a first part of the cutting edge which cut-forms forms the surface of said metal die corresponding to said second surface of said optical element, a second part of the cutting edge extending in the direction crossing said first part of the cutting edge, and a third part of the cutting edge which cut-forms the surface of said metal die corresponding to said third surface of said optical element, and the distance from the intersecting point of an extended line of said first part of the cutting edge and an extended line of said second part of the cutting edge to said third part of the cutting edge is from 0.1 μm to 3 μm; therefore, by an optical element formed by a metal die which is cut with the above-mentioned tool, transmitted light quantity can be sufficiently secured by suppressing scattering of an incident light.

Figure 8:
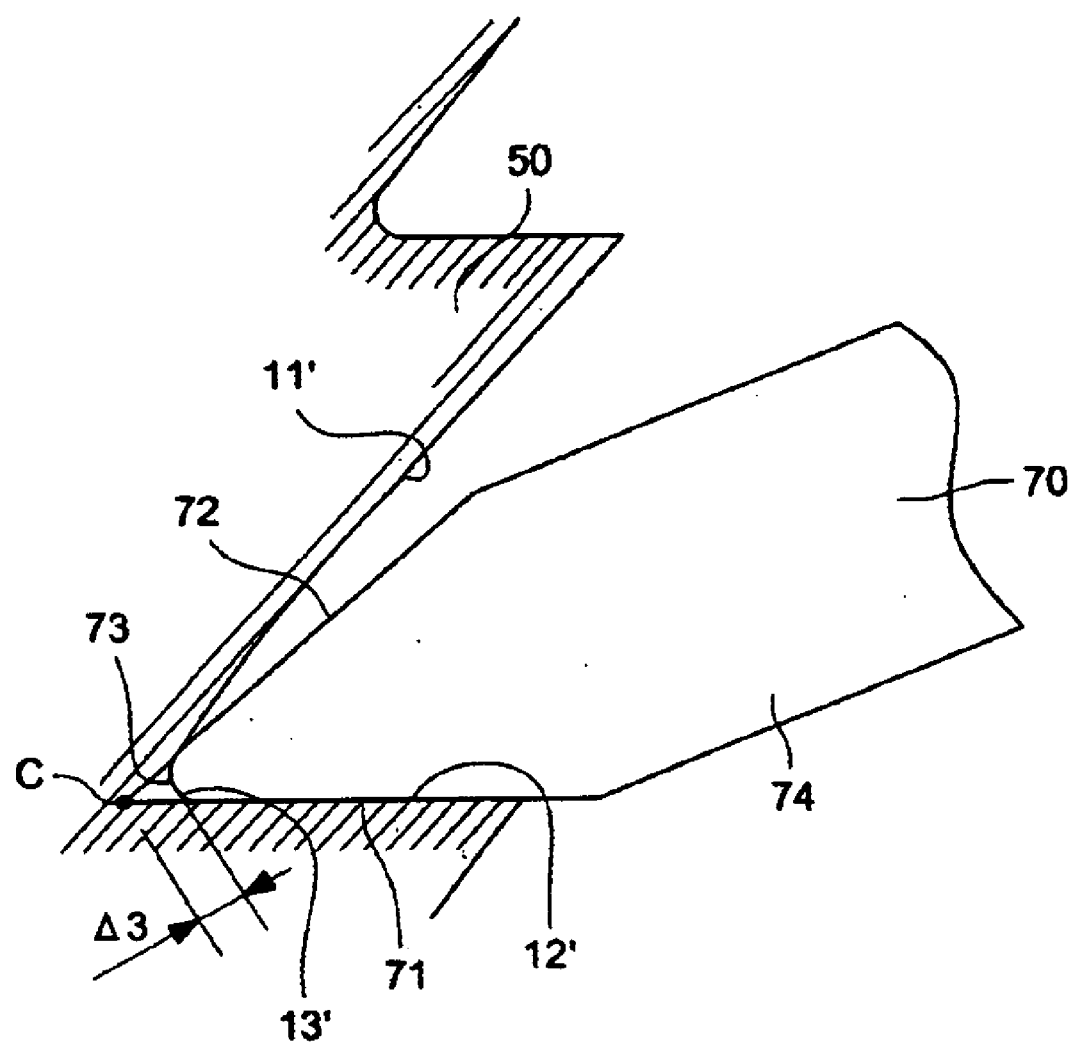
FIG. 8 is a drawing showing the relation between a tool 70 and a metal die 50 during cutting by a lathe.
Figure 9:
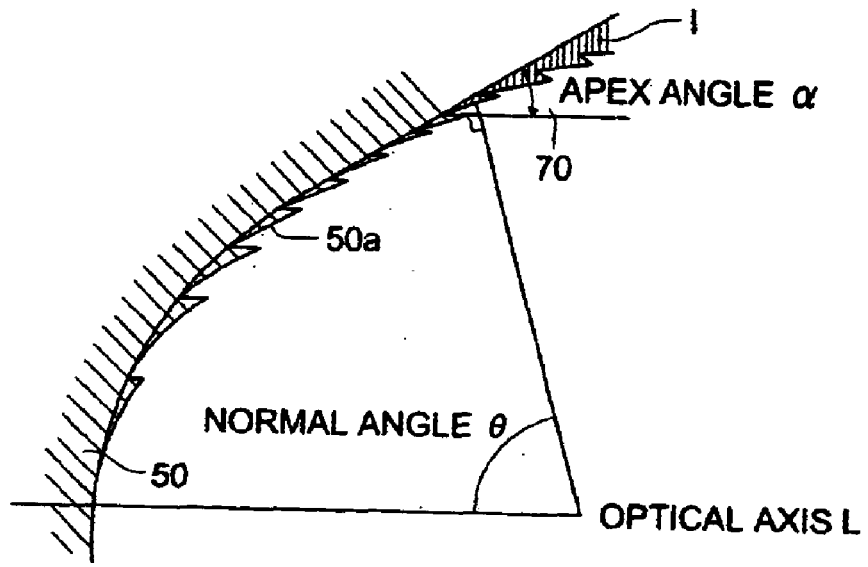
FIG. 9 is a drawing showing a cross-section of a metal die.

This invention will be explained in more detail by referring to the drawings. FIG. 8 is a drawing showing the relation between a tool 70 and a metal die 50 during cutting by a lathe. In FIG. 8, the metal die 50 has its three surfaces formed with the tool 70, that is, a first surface 11' corresponding to the first surface of diffractive grooves of an optical element which is expressed approximately by a specified optical function, a second surface 12' corresponding to the second surface which is approximately parallel to the optical axis, and a third surface 13' corresponding to the third surface connecting these. In this working, the rake face 74 of the tool 70 which is opposite to the rotating direction of the metal die 50, is outlined by a first part of the cutting edge 71 which cut-forms the surface 12' of the metal die 50, a second part of the cutting edge 72 extending in the direction crossing the first part of the cutting edge 71, and a third part of the cutting edge 73 which cut-forms the surface 13' of the metal die, and the distance Δ3 from the intersecting point of an extended line of the first part of the cutting edge 71 and an extended line of the second part of the cutting edge 72 to the part of the cutting edge 73 falls within a range from 0.1 μm to 3 μm; therefore, the surface 13' of the metal die 50 is controlled to be small, and by an optical element formed by the metal die 50 which is cut with this tool 70, transmitted light quantity can be sufficiently secured by suppressing scattering of an incident light.

A metal die set forth in (23) is characterized by it that it is worked with a tool as set forth in (22).

In a metal die set forth in (24), the aforesaid second surface is characterized by it that it is parallel to the optical axis with an angular error not greater than 1°.

An optical element set forth in (25) is characterized by it that it is formed by injection molding or by injection compression molding using a metal die as set forth in (23) or (24).

In an optical element set forth in (26), the aforesaid specified optical function is characterized by it that it is expressed by the following equations:

$$N=INT(Ah^2+Bh^4+C),$$

$$X(h,N)=h^2/(r_N(1+\sqrt{(1-(1+K_N)h^2/r_N^2)}))+A4_Nh^4+A6_Nh^6+A8_Nh^8+A10_Nh^{10}+\Delta N,$$

where N denotes the number of a ring-shaped zone of the aforesaid diffractive grooves, h denotes a height from the optical axis, X denotes a distance from a tangent plane in the direction of the optical axis, r denotes the radius of the curvature of the Nth ring-shaped zone, $K_NA4_N$ to $A10_N$ are the coefficients of the aspherical surface, and $\Delta=-\lambda_0/(n-1)$ denotes the amount of the shift of the wave front on the optical axis for $1\lambda_0$.

An optical element set forth in (27) is characterized by it that it is a coupling lens of an optical pickup device for use in an information recording and/or reproducing apparatus.

An optical element set forth in (28) is characterized by it that it is an objective lens which converges a parallel light beam coming from the direction of the optical axis.

An optical element set forth in (29) is characterized by it that it is an objective lens which converges a divergent light beam coming from the direction of the optical axis.

A tool set forth in (31) is a tool for cutting a metal die to be used in forming by molding an optical element which comprises, at least in a part of an optical surface, diffractive grooves provided with a first surface expressed approximately by a specified optical function, a second surface extending in the direction crossing said first surface, and a third surface connecting said first surface and said second surface, and is capable of transmitting light, wherein at least a part of the surface of said metal die is formed by rotary cut-working using said tool, the rake face of said tool, which is opposite to the rotating direction of said metal die during said rotary cut-working, is outlined by a first part of the cutting edge which cut-forms the surface of said metal die corresponding to said second surface of said optical element, a second part of the cutting edge extending in the direction crossing said first part of the cutting edge, and a third part of the cutting edge which cut-forms the surface of said metal die corresponding to said third surface of said optical element, and the angle α, which is made by said first part of the cutting edge and said second part of the cutting edge, is not smaller than 5° and satisfies an inequity θmax≦(90−(α/2+S))°, where θmax denotes the maximum normal angle of said metal die corresponding to said optical surface, and S denotes a set angle of the tool against the optical axis (what is called an offset angle); therefore, it never occurs that a metal die is subjected to an interference by a tool, which makes it possible to manufacture an optical element having a more suitable shape.

In particular, because the curvature of the optical surface has a tendency to become stronger in the case of a metal die for forming a high-NA lens, in some cases the normal angle θ (the angle made by a normal and the optical axis) of the optical surface shape becomes very large in the neighborhood of the outermost circumference of the optical surface shape 50a, and in this case, if a conventional tool is carelessly used, it provably occurs that a tool interference (an accident in which a part of a tool that is not a cutting edge engages with the metal die) occurs. In the following, examples of the tool interference which have been heretofore produced easily will be explained.

For the first mode of the tool interference, such an example as described below can be cited. In order not to lower diffraction efficiency, it is necessary that the step section of the diffractive grooves (the second surface 12 as shown in FIG. 2) are parallel to the incident bundle of rays. Hence, in the case where the incident bundle of rays is an infinite light beam, the step section make a cylindrical surface parallel to the optical axis. Further, in the case where the incident bundle of rays is a divergent one, a conical shape such that a step section overhangs to a degree not to produce a shadow for an incident bundle of rays is ideal; However, this shape has an undercut section at the time of forming a lens, and a problem that an optical element which has been injection-molded sticks to the metal die and cannot be released is produced. For that reason, it is desirable that the step section is parallel to the optical axis and cylindrical for these incident bundle of rays.

However, in cut-working a metal die for molding with a tool, as shown in FIG. 7(b), it is necessary to set the tool with an inclination to the direction of the outer circumference by an offset angle S (an angle equal to ½ of the apex angle α, for example). Accordingly, elbowroom for the tool is 90°−(α/2+S) only, and in order that the metal die may not interfere the tool during cut-working, a normal angle at anywhere on the optical surface must be smaller than this value. On top of it, in an actual optical element, in order that a flange portion for fixing the element may be provided integrally at the outer side in the radial direction of the optical surface, it often occurs that the optical surface is required to have a shape extended to the farther outside of the effective diameter; therefore, it is understood that, also in this extended portion which does not actually transmit a bundle of rays, the angle α must be not smaller than 5° and satisfy an inequity θmax≦(90−(α/2+S))°, where S denotes a set angle of the tool against the optical axis. In addition, "an offset angle of a tool" means an angle made by a line which bisects equally the apex angle of the cutting part and the optical axis of the optical surface to be cut-worked.

Accordingly, if the shape function of a diffractive optical surface to be worked is known beforehand, the normal angle θ is known from its differential values; therefore, if the maximum normal angle θmax in the range of working is obtained, the apex angle αmax to become a limit up to which no tool interference occurs is obtained from the above inequality, and a desired shape can be safely cut-worked. However, if the apex angle of a tool is made too small, the yield in manufacturing the tool is lowered, which makes the price higher and lowers the stiffness; therefore, an accident such as "bibiri" and breakage is likely to occur. For that reason, it can be said that a degree of 10° or so for the apex is a practical limit as a tool for a metal die to mold an optical element. The offset angle for this apex angle value should be 5° or over in order to make the step section of diffractive grooves parallel to the optical axis.

A metal die set forth in (32) is characterized by it that it is worked with a tool as set forth in (31).

A metal die set forth in (33) is characterized by it that the aforesaid second surface is parallel to the optical axis with an angular error not greater than 1°.

A metal die set forth in (34) is characterized by it that grooves corresponding to the aforesaid diffractive grooves of the aforesaid optical element are formed in an area for which the value of the aforesaid maximum normal angle φmax falls within a range from 40° to 70°.

An optical element set forth in (35) is characterized by it that it is formed by injection molding or by injection compressing molding using a metal die as set forth in any one of structures (32) to (34).

In an optical element set forth in (36), the aforesaid specified optical function is characterized by it that it is expressed by the following equations:

$$N=INT(Ah^2+Bh^4+C),$$

$$X(h,N)=h^2/(r_N(1+(1-(1+K_N)h^2/r_N^2)))+A4_N h^4+A6_N h^6+A8_N h^8+A10_N h^{10}+\Delta N,$$

where N denotes the number of a ring-shaped zone of the aforesaid diffractive grooves, h denotes a height from the optical axis, X denotes a distance from a tangent plane in the direction of the optical axis, r denotes the radius of the curvature of the Nth ring-shaped zone, $K_N, A4_N$ to $A10_N$ are the coefficients of the aspherical surface, and $\Delta=-\lambda_0/(n-1)$ denotes the amount of the shift of the wave front on the optical axis for $1\lambda_0$.

An optical element set forth in (37) is characterized by it that it is a coupling lens of an optical pickup device for use in an information recording and/or reproducing apparatus.

An optical element set forth in (38) is characterized by it that it is an objective lens which converges a parallel light beam coming from the direction of the optical axis.

An optical element set forth in (39) is characterized by it that it is an objective lens which converges a divergent light beam coming from the direction of the optical axis.

An optical element set forth in (40) is characterized by it that it is a collimator.

A tool set forth in (31) is a tool for cutting a metal die to be used in forming by molding an optical element which comprises, at least in a part of an optical surface, diffractive grooves provided with a first surface expressed approximately by a specified optical function, a second surface extending in the direction crossing said first surface, and a third surface connecting said first surface and said second surface, and is capable of transmitting light, wherein at least a part of the surface of said metal die is formed by rotary cut-working using said tool, the rake face of said tool, which is opposite to the rotating direction of said metal die during said rotary cut-working, is outlined by a first part of the cutting edge which cut-forms the surface of said metal die corresponding to said second surface of said optical element, a second part of the cutting edge extending in the direction crossing said first part of the cutting edge, and a third part of the cutting edge which cut-forms the surface of said metal die corresponding to said third surface of said optical element, in respect of a first flank which makes up said first part of the cutting edge with said rake face, and a second flank which makes up said second part of the cutting edge with said rake face, the inclination angle of said first flank against said rake face and the inclination angle of said second flank against said rake face is different from each other, and the difference falls within a range from 1° to 20°; therefore, it never occurs that a metal die is subjected to interference by a tool, which makes it possible to manufacture an optical element having a more suitable shape. If the difference is less than 1°, the effect is little, and if it exceeds 20°, manufacturing of a tool becomes difficult. In addition, the both angles of inclination mean respectively an angle made by said first flank against a virtual plane perpendicular to said rake face at the first part of the cutting edge and an angle made by said second flank against a virtual plane perpendicular to said rake face at the second part of the cutting edge.

The second mode of the tool interference will be explained. The shape of the diamond chip of the cutting part of a conventional tool forms, as shown in FIG. 4, a first clearance angle β1 by it that the flanks 75 and 76 making up the apex angle intersect each other with an angle deviated by several degrees from the rectangle against the rake face. The tool is designed in such a manner that, by forming the second clearance face 77 further, it never occurs that the flanks 75 and 76 extend long toward lower direction to such a degree as to interfere the shape of the optical surface of a metal die. However, the first clearance angle β1 has a limit of about 10° at the maximum because of generation of chips etc. during manufacturing of the tool, and the angles of inclination of the flanks 75 and 76 have a limit of several degrees, which depends on the apex angle α.

In a conventional tool, the inclination angles of the flanks 75 and 76 have been taken as equal for both left and right sides, which makes the shape of the edge symmetric in respect to left-and-right direction. Therefore, the inclination angle of the flanks is uniquely determined if the apex angle α is determined, and it has been put into practice that, in the case where the ridgeline of one of the flanks 75 and 76 and the second clearance face 77 generates tool interference, the angle β2 of the second clearance face 77 is usually made to take a value falling within a range from 40° to near 50°. It is a matter of course that this lowered the strength of the cutting part and increased the frequency of generation of "bibiri" or chips during working, which made difficult the working of a high-precision diffractive optical surface shape.

Therefore, the inventors found out that, in order to cut-work an ideal diffractive optical surface shape, if a tool is set in such a manner as shown in FIG. 7(b), in respect of the flanks in the inner circumferential side, the inclination angle 0° produces no problem at all. Accordingly, it has been found out that, because the inclination angle for the flanks in the outer circumferential side where a tool interference occurs provably can be increased to a value near two times, and owing to this, the ridgelines of the flanks 75 and 76 and the second clearance face 77 retracts more toward the center of the tool, without lowering the strength of an edge, and also without lowering the efficiency in manufacturing, a tool interference can be avoided.

A metal die set forth in (42) is characterized by it that it is worked with a tool as set forth in (41).

A metal die set forth in (43) is characterized by it that the aforesaid second surface is parallel to the optical axis with an angular error not greater than 1°.

An optical element set forth in (44) is characterized by it that it is formed by injection molding or by injection compression molding using a metal die as set forth in (43).

An optical element set forth in (45) is characterized by it that the aforesaid specified optical function is expressed by the following equations:

$$N=INT(Ah^2+Bh^4+C),$$

$$X(h,N)=h^2/(r_N(1+\sqrt{(1-(1+K_N)h^2/r_N^2)}))+A4_Nh^4+A6_Nh^6+A8_Nh^8+A10_Nh^{10}+\Delta N,$$

where N denotes the number of a ring-shaped zone of the aforesaid diffractive grooves, h denotes a height from the optical axis, X denotes a distance from a tangent plane in the direction of the optical axis, r denotes the radius of the curvature of the Nth ring-shaped zone, $K_N A4_N$ to $A10_N$ are the coefficients of the aspherical surface, and $\Delta=-\lambda_0/(n-1)$ denotes the amount of the shift of the wave front on the optical axis for $1\lambda_0$.

An optical element set forth in (46) is characterized by it that it is a coupling lens of an optical pickup device for use in an information recording and/or reproducing apparatus.

An optical element set forth in (47) is characterized by it that it is an objective lens which converges a parallel light beam coming from the direction of the optical axis.

An optical element set forth in (48) is characterized by it that it is an objective lens which converges a divergent light beam coming from the direction of the optical axis.

An optical element set forth in (49) is characterized by it that it is a collimator.

A tool set forth in (31) is a tool for cutting a metal die to be used in forming by molding an optical element which comprises, at least in a part of an optical surface, diffractive grooves provided with a first surface expressed approximately by a specified optical function, a second surface extending in the direction crossing said first surface, and a third surface connecting said first surface and said second surface, and is capable of transmitting light, wherein at least a part of the surface of said metal die is formed by rotary cut-working using said tool, the rake face of said tool, which is opposite to the rotating direction of said metal die during said rotary cut-working, is outlined by a first part of the cutting edge which cut-forms the surface of said metal die corresponding to said second surface of said optical element, a second part of the cutting edge extending in the direction crossing said first part of the cutting edge, and a third part of the cutting edge which cut-forms the surface of said metal die corresponding to said third surface of said optical element, in respect of a first flanks which makes up said first part of the cutting edge with said rake face, and a second flanks which makes up said second part of the cutting edge with said rake face, at least one of said flanks has a first inclination angle against said rake face, making a first clearance angle with an intersecting line of said first flank and said second flank, at least one of said first flank and said second flank further has a second inclination angle against said rake face, and at least, the flank having this second inclination angle and the other flank forms an intersecting line, which makes a second clearance angle; therefore, it never occurs that a metal die is subjected to an interference by a tool, which makes it possible to manufacture an optical element having a more suitable shape.

In order to avoid the tool interference more certainly, the inventors propose a tool having a completely new design.

Figure 10:
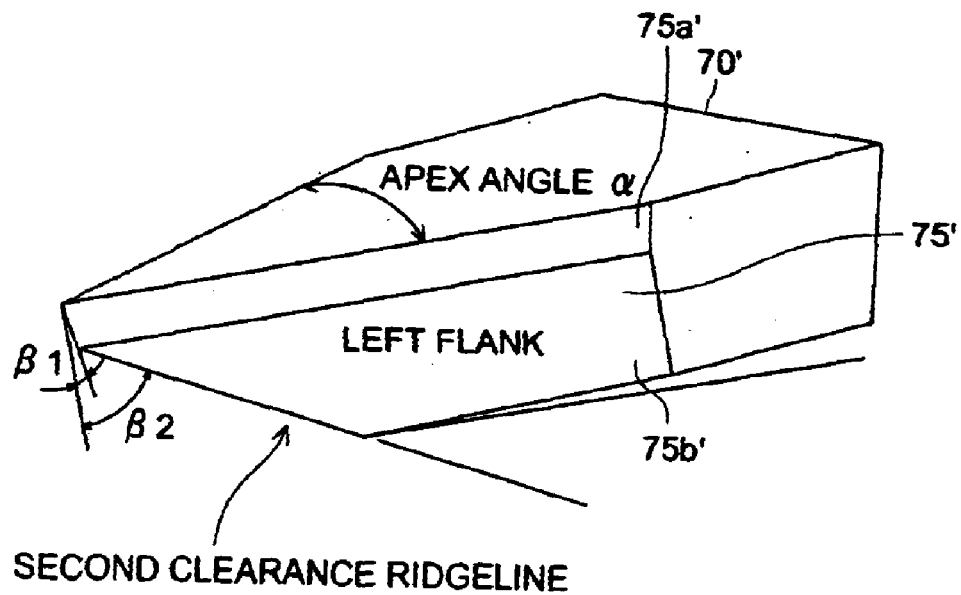
FIG. 10 is a perspective view of a new tool according to this invention.

FIG. 10 is a perspective view of such a new tool according to this invention. In FIG. 10, the flank 75' of a tool 70' is composed of the upper flank 75a' and the lower flank 75b', and in the case where the inclination angle of the upper flank 75a' is, for example, 5°, it is desirable that the second inclination angle of the lower flank 75b' is a value exceeding 5°.

In this way, by making the inclination angle of the flank 75' not of a single stage only, but of double stages, to form a second clearance angle β2 by the mutual intersection of the flanks owing to this inclination angle of this second stage, the above-mentioned second clearance face can be omitted. Owing to this, because the flank 75' has its portion of the first inclination angle made narrow as the thickness of the portion of the tool forming the first clearance angle and switches over to the portion of the second inclination angle to form a large second clearance angle β2, the tool interference can be avoided with a greater stride as compared with the conventional one. Further, the portion of the edge thickness corresponding to the first clearance angle β1, which actually has a cutting edge, has completely the same shape as a conventional one, it can be prevented that the strength of the corner edge is extremely lowered.

Further, it has a shape capable of corresponding to the above-mentioned asymmetric inclination angles of side faces; therefor, by combining these factors, it is possible to cut-work a metal die for an optical surface having an extremely [small] large curvature or a high-NA lens with a sufficient elbowroom and strength.

A metal die set forth in (51) is characterized by it that it is worked with a tool as set forth in (50).

In a metal die set forth in (52), the aforesaid second surface is characterized by it that it is parallel to the optical axis with an angular error not greater than 1°.

An optical element set forth in (53) is characterized by it that it is formed by injection molding or injection compression molding using a metal die as set forth in (52).

In an optical element set forth in (36), the aforesaid specified optical function is characterized by it that it is expressed by the following equations:

$$N = INT(Ah^2 + Bh^4 + C),$$

$$X(h,N) = h^2/(r_N(1+\sqrt{1-(1+K_N)h^2/r_N^2})) + A4_N h^4 + A6_N h^6 + A8_N h^8 + A10_N h^{10} + \Delta N,$$

where N denotes the number of a ring-shaped zone of the aforesaid diffractive grooves, h denotes a height from the optical axis, X denotes a distance from a tangent plane in the direction of the optical axis, r denotes the radius of the curvature of the Nth ring-shaped zone, $K_N A4_N$ to $A10_N$ are the coefficients of the aspherical surface, and $\Delta = -\lambda_0/(n-1)$ denotes the amount of the shift of the wave front on the optical axis for $1\lambda_0$.

An optical element set forth in (55) is characterized by it that it is a coupling lens of an optical pickup device for use in an information recording and/or reproducing apparatus.

An optical element set forth in (56) is characterized by it that it is an objective lens which converges a parallel light beam coming from the direction of the optical axis.

An optical element set forth in (57) is characterized by it that it is an objective lens which converges a divergent light beam coming from the direction of the optical axis.

An optical element set forth in (58) is characterized by it that it is a collimator.

The term "diffractive grooves" as used in this specification means grooves of a relief which is provided on a surface of a lens and made to have a function to converge or diverge a bundle of rays by diffraction. For the shape of the relief, for example, it is known a shape which is formed as nearly concentric circular ring-shaped zones around the optical axis, which has a sawtooth-shaped cross-section as seen at a plane including the optical axis; such a shape is included in it.

In this specification, the term "an objective lens" denotes, in its narrower sense, a single lens having a light-converging function which is arranged opposite to an optical information recording medium at the most nearest side of it in a state in which an optical pickup device is loaded with an optical information recording medium, or in a broader sense, a lens group capable of moving at least in the direction of the optical axis by an actuator together with that single lens. In the above description, the lens group denotes at least a single lens or more (two lenses, for example). Hence, in this specification, the numerical aperture NA of an objective lens of the side facing an optical information recording medium (the image side) denotes the numerical aperture NA of a lens surface which is positioned nearest to and facing the optical information recording medium. Further, in this specification, the required numerical aperture NA denotes a numerical aperture specified in the standard of each optical information recording medium, or a numerical aperture of an objective lens having a diffraction limit performance capable of obtaining a spot diameter which is required for recording or reproducing information for each optical information recording medium, in accordance with the wavelength of the light source used.

In this specification, an optical information recording medium means, for example, an optical disk of a CD type such as a CD-R, a CD-RW, a CD-Video, and a CD-ROM, or an optical disk of a DVD type such as a DVD-ROM, a DVD-RAM, a DVD-R, a DVD-RW, and a DVD-Video.

In the following, examples of practice of this invention will be explained. In addition, in respect of an offset angle, there are a case where a tool is deflected to left and a case where a tool is deflected to right; hence for these cases, it is referred to as, for example, an offset angle of 20° to left, and an offset angle of 20° to right respectively. In the following examples of practice, a tool is deflected to left.

EXAMPLE OF PRACTICE 1

The corner of the cutting part of a tool (hereinafter referred to as a straight turning tool) having an apex angle of 40° of the cutting part was found to have an arc-shape with a length of the chord approximately 1 μm by an observation using an optical microscope with 800 times of magnification. Accordingly, the shape of the corner of the cutting part was regarded as an arc of radius 0.5 μm. In this case, the distance from the virtual apex of the edge to the end point of the arc was 0.5 μm/sin 20°=1.46 μm, which is within 3 μm. This straight turning tool was fitted to a super-precision lathe (FIG. 3) with an offset angle of 20°, was set in a manner such that the step section of diffractive grooves is parallel to the optical axis of the optical surface to be worked with an angular error of 1° or under, and the diffractive optical surface of the metal die for a plastic objective lens to be used for a DVD or a CD in either way was cut-worked. On the other hand, with a straight turning tool having rounded corner, which had been finished to have a corner radius of the rake face 3 μm and a roundness of 50 nm or under and was set at an offset angle of 20° to a super-precision lathe, the diffractive optical surface of a metal die for molding an objective lens having the same shape as the above-mentioned for a pickup device was cut-worked. The conditions of cut-working are the same for both. After the measurement of the surface roughness Rz of the former and latter metal dies obtained, the both metal dies were fitted in the same die-fixture, and injection molding was performed in completely the same conditions; thus, plastic objective lenses of the same specification for both of a DVD or a CD were obtained respectively. These objective lenses were actually loaded in a pickup unit, and the amplitude of an eye-pattern signal was measured for a DVD and a CD. The results of the above-mentioned measurements were shown in Table 2.

TABLE 2

|  | Surface roughness of metal die Rz | Maximum width of edge end/ Width of diffraction | DVD signal amplitude | CD signal amplitude |
|---|---|---|---|---|
| Lens molded by metal die worked by straight tool | 42.1 nm | 3.8% | 1.756 Vpp | 1.323 Vpp |
| Lens molded by metal die worked by rounded tool | 12.3 nm | 21.1% | 1.251 Vpp | 1.278 Vpp |

Although the surface roughness Rz of the worked metal die worked with the straight turning tool is three times worse than that of the metal die worked with the rounded tool, light quantity loss owing to scattering is not produced nearly at all. On the contrary, because the ratio of the width of the imperfect-shaped portion to the width of the diffractive grooves is nearly 1/6 of that for the rounded tool owing to the corner radius R of the cutting edge being three times sharper, diffraction efficiency is remarkably improved; the amplitude value of the DVD signal which is more influenced by diffraction light is improved by 29% more than the metal die worked with the straight turning tool having rounded corner. As the result of this, it was found that in a metal die cut-worked with a straight turning tool, so long as the surface roughness Rz falls within a range from 1/1000 to 1/10 of the wavelength, and the ratio of the width of the imperfect-shaped portion to the width of the diffractive grooves cut-worked falls within a range from 0.5% to 15%, scattering is little, and a sufficient quantity of transmitted light could be obtained.

EXAMPLE OF PRACTICE 2

With a straight tool having an apex angle of 30° whose corner of the cutting part lies within 1.3 μm from the virtual apex position, the diffractive optical surface of a metal die for molding an objective lens for use in a pickup device using a light source wavelength of 405 nm was cut-worked. Before working, assuming the limit value of Rz was λ/10 (40.5 nm), the radius R in the case where the corner of the cutting part was regarded as an arc was calculated from the equation 2, to obtain 348 nm. From this value and the limit value of Rz, feed rate was calculated by using the equation (1), to obtain 244 nm/rev In accordance with these cutting conditions, the number of revolutions of the spindle and the tool feed speed were set at 2000 rpm and 0.5 mm/min respectively, and cut-working was carried out. After fitting the finished metal die in a die-fixture, injection compression molding was carried out, to obtain a plastic objective lens which had a low birefringence and was excellent in the ability of transferring the shape of a metal die. The measured quantity of transmitted light was 89.2% without reflection reducing coating (the refractive index of the material $n_{400}$= 1.55); it could be obtained almost an ideal value as compared with the calculated value 9.3% (for both surfaces) for the loss of light quantity owing to surface reflection for perpendicular incidence.

EXAMPLE OF PRACTICE 3

By using a three kinds of tools, which were a first straight turning tool having an apex angle of the cutting part of 40°, a first clearance angle of 10°, and a second clearance angle of 40°, a second straight turning tool of a specification which was different from the first one in the apex angle being 30°, and was the same as the first one in other items, and a third straight turning tool having an apex angle of the cutting part of 30° and asymmetric inclination angles of the flanks of the cutting part, it was cut-worked, the diffractive optical surface of a metal die for molding a lens for use in a pickup device for a DVD, and the metal die had the maximum normal angle 53° at its outermost circumference, which was positioned outside the effective diameter. A tool having an apex angle of the cutting part of 40° was attached to a super-precision lathe with an offset angle of 20° to left in such a manner that the step section of the diffractive grooves became parallel to the optical axis of the optical surface to be worked with an angular error not greater than 1°, and cutting was started from the outermost portion of the metal die; however, it was found that a cone-shaped optical surface was generated in the outermost circumference portion, and the ridgeline of the rake face and the flank interfered the metal die. Therefore, the tool was switched over to the tool having the apex angle of the cutting part of 30°, with the tool holder left as it was, and the tool was fitted with an offset angle of 20°, to cut-work; however, it was found that the ridge line of the flank and the second clearance face was in contact with the metal die. Then, the clearance angle of the second clearance face was measured, to find 38.5°, which is slightly under 40°, and it was found that the tool interference was produced for the reason that a tool having a small second clearance angle owing to dispersion in manufacturing tools was used by chance.

Therefore, an asymmetric straight turning tool having an apex angle of 30° likewise, the inclination of flank of the cutting part to the offset direction 0°, and the inclination of the other flank of the cutting part 4.9° is fitted to a super-precision lathe with an offset angle of 20° to left, and the optical surface of a metal die was cut-worked again. No tool interference was produced, and because the clearance between the flank of the tool and the optical surface was large, the elimination of the cut scraps and the feeding-in of lubricant liquid could be sufficiently performed; as the result, a high-quality optical surface with less catching of chips was obtained. In this connection, the inclination angle of the flanks of the cutting part of the symmetric straight turning tool having the apex angle 30° which produced tool interference was 2° for both left and right sides.

From the above description, in the case of the tool having the apex angle of the cutting part 40°, the normal angle was 90°−(40°/2+20°)=50°, which is smaller than the maximum normal angle 53°; therefore, it was backed up that tool interference was produced by the ridgeline of the rake face and the flank. Further, in the case where the apex angle of the cutting part is 30° and the offset angle is 20°, the normal angle was 90°−(30°/2+20°)=55°, it did not occur that the tool interference was produced by the ridgeline of the rake face and the flank, but because the inclination angle of the flank of the cutting part was small, the tool interference was produced by the ridgeline of the flank and the second clearance face. However also in this case, by making the inclination angles of the flanks of the edge asymmetric, the clearance of the flank coming close to the optical surface of the metal die could be made large, by which the production of tool interference could be suppressed.

EXAMPLE OF PRACTICE 4

By using an asymmetric straight turning tool having an apex angle of the cutting part of 25°, an angle of inclination of the second clearance face of 40°, an angle of inclination of the right flank of 4.9°, and an angle of inclination of the left flank of 0°, and an asymmetric straight turning tool having an apex angle of the cutting part of 25°, a first clearance angle of 10°, no second clearance face, the ridgeline of the second clearance angle formed by the intersection of the left and right flanks, a second clearance angle of 40°, a first inclination angle of 4.9° of the right flank, a second inclination angle of 20° of it, an inclination angle of 0° of the left flank, and no second inclination angle, the optical surface of a metal die for molding a diffractive objective lens having the maximum normal angle 61.6° and the NA 0.85 for use in a pickup device was cut-worked. It was understood that, for an offset angle of 15°, the normal angle for both tools became 90°−(25°/2+15°)=62.5°, then the tool interference by the apex angle of the cutting part for the maximum normal angle could be avoided; therefore, the tool was set at the offset angle 15° to left to an super-precision lathe.

When the surface of a metal die was cut-worked with the former tool, the ridgeline of the right side face and the second clearance face interfered the metal die, and it occurred not only that the diffractive optical surface could not be generated, but also that the optical surface was damaged to a large extent, which made it unable to use it by reworking. Thus, a new piece of the same metal die was prepared and cut-worked with the latter tool; then it was found that tool interference was not produced and the cut-working of the optical surface could be performed.

Regarding the flanks of the cutting part, only the one side may have two steps of inclination, or the inclination angle may be varied by 1° or more for the left and right sides to make the shape asymmetric; further, also it is appropriate that the flanks have a shape which is hard to produce tool interference by increasing the clearance of the tool owing to a synergistic effect through making the combination of these. The scope of this invention covers each of means for avoiding tool interference and also the combination of them.

According to this invention, by making definite the values and the ranges which are required for obtaining a sufficient quantity of transmitted light, it is possible to provide a metal die capable of actualizing the manufacturing of a diffractive optical element having a high efficiency, a tool for it, and an optical element manufactured by it.

What is claimed is:

1. An optical element capable of transmitting light, comprising:
    an optical surface having an optical axis;
    diffractive grooves provided on at least a part of the optical surface and each of the diffractive grooves including
        a first surface capable of being approximated by a predetermined optical function;
        a second surface extending in a direction to cross the first surface and being parallel to the optical axis with an angular error not greater than 1°; and
        a third surface not approximated by the predetermined optical function and to connect the first surface and the second surface;
    wherein a width of the third surface in the direction perpendicular to the optical axis is 0.5% to 15% of the sum of a width of the first surface in the direction perpendicular to the optical axis and the width of the third surface in the direction perpendicular to the optical axis, and
    wherein the predetermined optical function is represented by the following formula:

$$N=INT(Ah^2+Bh^4+C),$$

$$X(h,N)=h^2/(r_N(1+\sqrt{(1-(1+K_N)h^2/r_N^2)}))+A4_Nh^4+A6_Nh^6+A8_Nh^8+A10_Nh^{10}+\Delta N,$$

wherein N denotes the number of a ring-shaped zone of each of the diffractive grooves, h denotes a height from the optical axis, X denotes a distance from a tangent plane in the direction of the optical axis, $r_N$ denotes a radius of a curvature of N-th ring-shaped zone, $K_N A4_N$ to $A10_N$ are coefficients of an aspherical surface of the N-th ring-shaped zone, and $\Delta=-\lambda_0/(n-1)$ denotes an amount of a face shift corresponding to $1\lambda_0$ on the optical axis.

2. The optical element of claim 1, wherein the optical element is a coupling lens for use in an optical pickup apparatus used for an information recording or an information reproducing apparatus or both.

3. The optical element of claim 2, wherein the optical element is an objective lens to converge a parallel light flux parallel to the optical axis.

4. The optical element of claim 2, wherein the optical element is an objective lens to converge a divergent light flux divergent to the direction of the optical axis.

5. The optical element of claim 2, wherein the optical element is a collimator.

6. An optical element capable of transmitting light, comprising:
    an optical surface having an optical axis;
    diffractive grooves provided on at least a part of the optical surface and each of the diffractive grooves including
        a first surface capable of being approximated by a predetermined optical function; and
        a second surface extending in a direction to cross the first surface;
    wherein a surface roughness Rz of the first surface is not larger than 1/10 of a wavelength of a light source used with the optical element, and
    wherein the predetermined optical function is represented by the following formula:

$$N=INT(Ah^2+Bh^4+C),$$

$$X(h,N)=h^2/(r_N(1+\sqrt{(1-(1+K_N)h^2/r_N^2)}))+A4_Nh^4+A6_Nh^6+A8_Nh^8+A10_Nh^{10}+\Delta N,$$

where N denotes the number of a ring-shaped zone of each of the diffractive grooves, h denotes a height from the optical axis, X denotes a distance from a tangent plane in the direction of the optical axis, $r_N$ denotes a radius of a curvature of N-th ring-shaped zone, $K_N A4_N$ to $A10_N$ are coefficients of an aspherical surface of the N-th ring-shaped zone, and $\Delta=-\lambda_0/(n-1)$ denotes an amount of a face shift corresponding to $1\lambda_0$ on the optical axis.

7. The optical element of claim 6, wherein a second surface is parallel to the optical axis with an angular error not greater than 1.

8. The optical element of claim 6, wherein the optical element is a coupling lens for use in an optical pickup apparatus used for an information recording or an information reproducing apparatus or both.

9. The optical element of claim 6, wherein the optical element is an objective lens to converge a parallel light flux parallel to the direction of the optical axis.

10. The optical element of claim 6, wherein the optical element is an objective lens to converge a divergent light flux divergent to the direction of the optical axis.

11. The optical element of claim 6, wherein the optical element is a collimator lens.

12. The optical element of claim 1, wherein the width of the third surface in the direction perpendicular to the optical axis is 0.5% to 10% of the sum.

13. The optical element of claim 12, wherein the width of the third surface in the direction perpendicular to the optical axis is 0.5% to 5% of the sum.

14. The optical element of claim 6, wherein the surface roughness Rz of the first surface is not smaller than $1/1000$ of the wavelength of the light source.

* * * * *

UNITED STATES PATENT AND TRADEMARK OFFICE
CERTIFICATE OF CORRECTION

PATENT NO. : 6,771,435 B2
DATED : August 3, 2004
INVENTOR(S) : Shigeru Hosoe

It is certified that error appears in the above-identified patent and that said Letters Patent is hereby corrected as shown below:

Column 24,
Line 67, "than 1." should read -- than 1°. --.

Signed and Sealed this

Twenty-fourth Day of May, 2005

JON W. DUDAS
*Director of the United States Patent and Trademark Office*